(12) United States Patent
Green et al.

(10) Patent No.: US 9,807,042 B2
(45) Date of Patent: Oct. 31, 2017

(54) ENHANCED REAL-TIME MESSAGING

(71) Applicant: Sybase, Inc., Dublin, CA (US)

(72) Inventors: Russell Green, Pleasanton, CA (US); Stephen Kwan, Dublin, CA (US); Joseph Hardy Lipscomb, Pleasanton, CA (US); Michael Daragh O'Sullivan, Singapore (SG)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 15/242,013

(22) Filed: Aug. 19, 2016

(65) Prior Publication Data

US 2016/0359780 A1    Dec. 8, 2016

Related U.S. Application Data

(63) Continuation of application No. 14/475,152, filed on Sep. 2, 2014, now Pat. No. 9,462,532.

(51) Int. Cl.
| | |
|---|---|
| *H04M 1/66* | (2006.01) |
| *H04M 1/68* | (2006.01) |
| *H04M 3/16* | (2006.01) |
| *H04L 12/58* | (2006.01) |
| *H04W 40/02* | (2009.01) |
| *H04W 4/14* | (2009.01) |
| *H04W 12/06* | (2009.01) |
| *H04L 12/725* | (2013.01) |

(Continued)

(52) U.S. Cl.
CPC ............ *H04L 51/046* (2013.01); *H04L 45/22* (2013.01); *H04L 45/3065* (2013.01); *H04L 51/36* (2013.01); *H04L 51/38* (2013.01); *H04W 4/14* (2013.01); *H04W 12/06* (2013.01); *H04W 40/02* (2013.01); *H04W 72/0453* (2013.01); *H04W 88/16* (2013.01); *H04W 88/184* (2013.01)

(58) Field of Classification Search
CPC ...................................... G06Q 20/00
USPC .......................................... 455/411
See application file for complete search history.

(56) References Cited

U.S. PATENT DOCUMENTS

| | | | | |
|---|---|---|---|---|
| 5,361,401 A | * | 11/1994 | Pirillo | H04W 72/02 370/344 |
| 8,818,430 B1 | | 8/2014 | Pulugurta et al. | |

(Continued)

*Primary Examiner* — Fabricio R Murillo Garcia
(74) *Attorney, Agent, or Firm* — Brake Hughes Bellermann LLP

(57) ABSTRACT

A system includes a gateway that is configured to receive a message from a source for transmission to a destination and multiple communication channels on which to transmit the message to the destination, where the communication channels include different types of communication channels. The system includes a decision engine that is operably coupled to the gateway and the communication channels. The decision engine is configured to select a first communication channel from the communication channels to route the message for transmission to the destination. The decision engine is configured to select a second communication channel from the communication channels to route the message for transmission to the destination in response to a period of time expiring without receiving an acknowledgement from the destination via the first communication channel, where the second communication channel is a different type of communication channel than the first communication channel.

17 Claims, 7 Drawing Sheets

(51) Int. Cl.
*H04L 12/707* (2013.01)
*H04W 72/04* (2009.01)
*H04W 88/16* (2009.01)
*H04W 88/18* (2009.01)

(56) References Cited

U.S. PATENT DOCUMENTS

| | | | |
|---|---|---|---|
| 2005/0119017 A1* | 6/2005 | Lovell, Jr. | H04W 8/12 |
| | | | 455/466 |
| 2009/0138563 A1* | 5/2009 | Zhu | H04W 4/14 |
| | | | 709/206 |
| 2010/0278137 A1 | 11/2010 | Kwon et al. | |
| 2012/0057452 A1 | 3/2012 | Gunukula et al. | |
| 2012/0294303 A1* | 11/2012 | Bossemeyer, Jr. | H04L 12/2856 |
| | | | 370/352 |
| 2013/0144776 A1 | 6/2013 | Webster et al. | |
| 2014/0031070 A1* | 1/2014 | Nowack | H04L 29/06176 |
| | | | 455/466 |
| 2014/0330626 A1 | 11/2014 | Fisher | |
| 2016/0066246 A1 | 3/2016 | Green et al. | |

* cited by examiner

ENHANCED REAL-TIME MESSAGING

TECHNICAL FIELD

This description relates to systems and techniques for enhanced real-time messaging.

BACKGROUND

One entity may send a message to another entity for delivery by a designated type of single communication channel. Using a single communication channel for delivery of the message may have an increased risk of the message not being delivered or not being delivered timely (i.e., being delivered late), for example, due to any incident along the delivery chain. It may desirable to develop systems and techniques for more reliable delivery of messages.

SUMMARY

According to one general aspect, a system includes a gateway that is configured to receive a message from a source for transmission to a destination and multiple communication channels on which to transmit the message to the destination, where the communication channels include different types of communication channels. The system includes a decision engine that is operably coupled to the gateway and the communication channels. The decision engine is configured to select a first communication channel from the communication channels to route the message for transmission to the destination. The decision engine is configured to select a second communication channel from the communication channels to route the message for transmission to the destination in response to a period of time expiring without receiving an acknowledgement from the destination via the first communication channel, where the second communication channel is a different type of communication channel than the first communication channel.

In another general aspect, a computer-implemented method includes executing instructions stored on a non-transitory computer-readable storage medium. The method includes receiving a message from a source for transmission to a destination. The method includes selecting a first communication channel from multiple communication channels to route the message for transmission to the destination, where the communication channels include different types of communication channels. The method includes selecting a second communication channel from the communication channels to route the message for transmission to the destination in response to a period of time expiring without receiving an acknowledgement from the destination via the first communication channel, where the second communication channel is a different type of communication channel than the first communication channel.

In another general aspect, a system includes a gateway that is configured to receive a message from a source for transmission to a mobile device running a mobile application and at least two communication channels on which to transmit the message to the mobile device including a web-socket communication channel and a second communication channel that is different than the web-socket communication channel. The system includes a decision engine that is operably coupled to the gateway and the at least two communication channels, where the decision engine includes a storage module for storing routing information that is unique to the mobile device for the web-socket communication channel and the second communication channel, where the routing information is different for the web-socket communication channel and the second communication channel. The decision engine is configured to determine if a connection is active between the web-socket communication channel and the mobile device prior to selecting the web-socket communication channel, select the web-socket communication channel to route the message for transmission to the mobile device if the connection is active and select the second communication channel to route the message for transmission to the mobile device if the connection is not active. If the message was first transmitted using the web-socket communication channel, the decision engine is configured to select the second communication channel to route the message for transmission to the mobile device in response to a period of time expiring without receiving an acknowledgement from the mobile device via the web-socket communication channel.

The details of one or more implementations are set forth in the accompanying drawings and the description below. Other features will be apparent from the description and drawings, and from the claims.

DETAILED DESCRIPTION

This document relates generally to systems and techniques for telecommunications services. More specifically, this document relates to systems and techniques for enhanced real-time messaging for sending a message from a source to a destination through a system that is configured to route the message for transmission over at least one of multiple different communication channels. The communication channel may be selected based upon one or more rules. The selected communication channel may include an acknowledgment that the message was delivered to the destination. If an acknowledgment is not received within a configurable period of time, the system may route the message for transmission on a different communication channel. Other criteria including, for example, presence information, time preferences and geographic location, may be used to determine if and when to route the message for transmission on a different communication channel.

Figure 1:
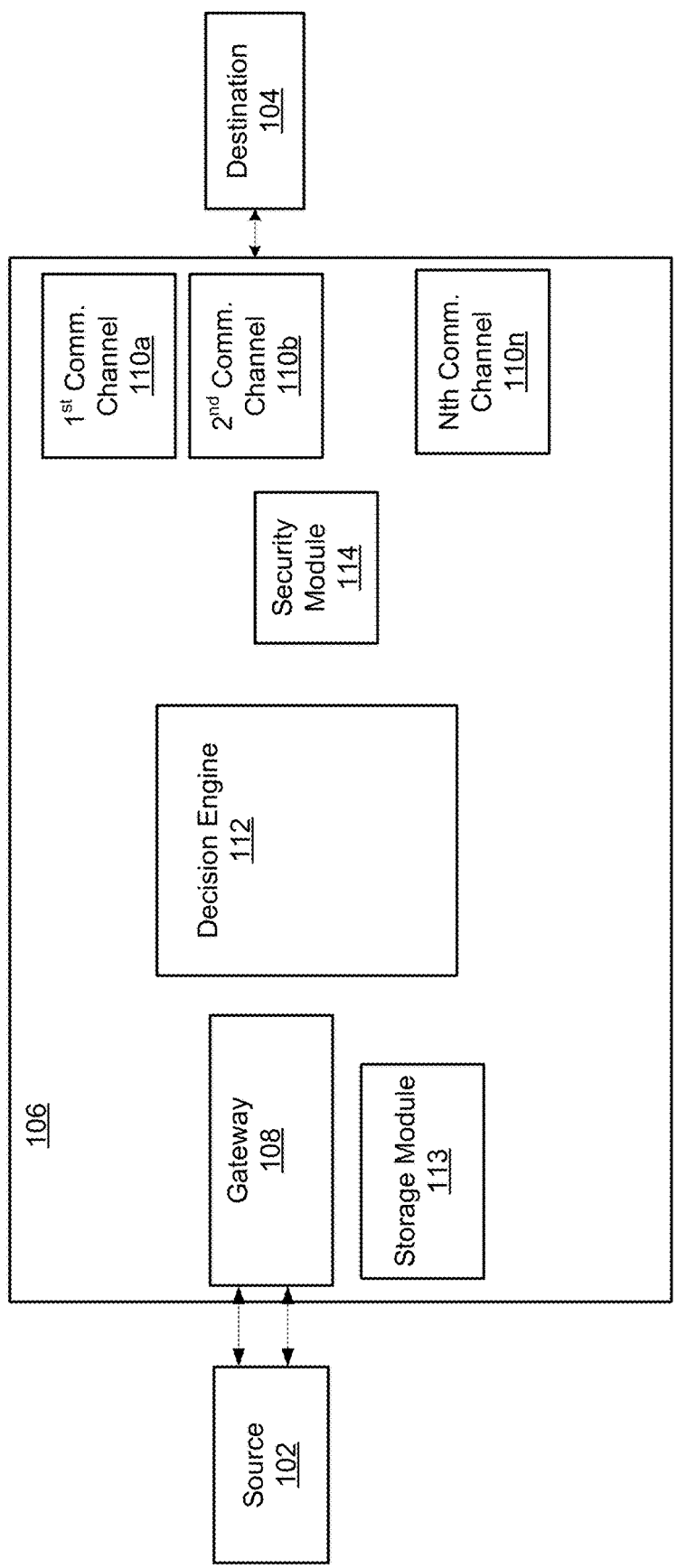
FIG. 1 is a block diagram of a system for message delivery between a source and a destination.

FIG. 1 is a block diagram of a system 100 for message delivery between a source and a destination. The system 100 includes a source 102, a destination 104 and an intermediary 106. The intermediary 106 is capable of receiving messages from the source 102 and routing the messages to the destination 104. While the intermediary 106 may be described herein as capable of routing messages from the source 102 to the destination 104, it is understood that the communication of messages may be bi-directional between the source 102 and the destination 104 through the intermediary 106.

The source 102 may initiate the sending of a message to the destination 104. The source 102 may represent any type of computing device that is configured to send and/or receive messages. The source 102 is representative of any computing device and/or entity at which the computing device is located prior to receipt of the message at the intermediary 106. While in this example, the source 102 is illustrated as a single block, the source 102 is representative of multiple different sources that communicate messages through the intermediary 106 to one or more different destinations.

In some implementations, the source 102 may designate whether a message or messages originating from the source 102 are communicated through the intermediary 106. The source 102 may directly send a message or messages to the intermediary 106 for routing to and/or delivery to the destination 104. Other messages from the source 102 may not be routed through the intermediary 106. In this manner, the source 102 may control whether or not the messages to the destination 104 are communicated through the intermediary 106. Of course, other implementations are possible including, for example, all messages originating from the source 102 may be communicated through the intermediary 106. Also, the intermediary 106 may be capable or configured to intercept some or all messages originating from the source 102 for routing and delivery to the destination 104. Additionally and/or alternatively, an entity other than the source 102 may be capable of or configured to control which messages originating from the source 102 are communicated through the intermediary 106.

In a similar manner, the destination 104 may be capable of receiving the message sent by the source 102 through the intermediary 106. The destination 104 may represent any type of computing device that is configured to receive and/or send messages. The destination 104 is representative of any computing device and/or entity at which the computing device is located that receives the delivered message as routed by the intermediary 106. While in this example, the destination 104 is illustrated as a single block, the destination 104 is representative of multiple different destinations that receive messages through the intermediary 106 from one or more different sources.

The intermediary 106 is configured to receive the message from the source 102 and to route the message on one or more communication channels for delivery to the destination 104. The intermediary 106 includes options for routing and delivery of the message using different types of communications channels. Further, as discussed above, the communications between the source 102 and the destination 104 may be bi-directional. Thus, the intermediary 106 is configured to receive messages from the destination 104 for delivery to the source 102.

In some example implementations, the intermediary 106 may function as a bridge or a hub between the source 102 and the destination 104. Also, as mentioned above the intermediary 106 may support message routing and delivery of messages from multiple different sources to multiple different destinations. The intermediary 106 may be scalable to accommodate providing the routing, delivery and other message-related services between multiple different sources and multiple different destinations.

The intermediary 106 includes a gateway 108, multiple communication channels 110a-110n and a decision engine 112. The gateway 108 is configured to receive a message from the source 102. The gateway 108 may function as an interface between the source 102 and the other components of the intermediary 106 for the initial receipt and handling of incoming messages.

The gateway 108 may be configured to handle one or more different types of protocols to receive incoming messages from the source 102. In one example implementation, the gateway 108 may include a hypertext transport protocol (HTTP) or secure hypertext transport protocol (HTTPS) gateway to receive messages from the source 102 using an HTTP protocol. Other protocols including the short message peer-to-peer (SMPP) protocol and the simple mail transfer protocol (SMTP) also may be included as part of the gateway 108 such that the gateway 108 may include multiple different protocols for enabling the receipt of messages using different protocols. It is understood that other types of protocols may be used to communicate the message from the source 102 for receipt by the gateway 108 and the gateway is programmed or programmable to receive message using being sent using the other types of protocols.

The communication channels 110a-110n include different types of channels or paths on which to communicate the message from the intermediary 106 to the destination 104. The intermediary 106 is scalable to handle multiple different types of communication channels. Examples of the different types of communication channels 110a-110n include a socket-based (e.g., web socket) communication channel, a short message service (SMS) communication channel, an enhanced message service (EMS) communication channel, a multimedia messaging service (MMS) communication channel, an application-oriented communication channel, an instant messaging (IM) communication channel, an electronic mail (e-mail) communication channel, a voice communication channel and social media channels. It is understood that these examples are not meant to limit the number or type of communication channels available in the intermediary 106 and that other communication channel types may be included.

In one example implementation, the intermediary at least include two communication channels: a first communication channel 110a and a second communication channel 110b, where the first communication channel 110a is a different type of communication channel than the second communication channel 110b. The first communication channel 110a and the second communication channel 110b may be different communication channel types selected from the examples described above. In this manner, the intermediary 106 has at least two different types of communication channels 110a,110b on which to route a message from the source 102 to the destination 104.

In one example implementation, the first communication channel 110a may include a socket-based communication channel such as a web-socket communication channel. The socket-based communication channel may provide push message or push notifications to the destination 104. The socket-based communication channel may include one or more features to provide message transmission delivery to the destination 104. For instance, one feature of the socket-based communication channel is that there may be a unique, secure channel established between the intermediary 106 and the destination 104. The secure channel may be established using a unique channel identifier (ID), which is a shared ID between the intermediary 106 and the destination 104. For the intermediary 106, the unique channel ID may be stored for use in a storage module 113. The storage module 113 may store the unique channel ID in a database or table, for instance, along with information that associates the unique channel ID with the particular destination such as a destination ID that can be used as part of a look up when sending messages to the particular destination.

Another feature of the socket-based communication channel is that a connection between the intermediary 106 and the destination 104 may be established as a persistent connection. The persistent connection between the intermediary 106 and the destination 104 may be checked by the intermediary 106 to determine if the connection is active prior to sending the message using this communication channel. If the connection is active, then the socket-based communication channel may be used to transmit the message to the destination 104. If the connection is not active, then the second communication channel 110b may be used to transmit the message to the destination 104.

Still another feature of the socket-based communication channel is that it may provide bi-directional communication between the intermediary 106 and the destination 104. In this manner, the destination 104 may provide an acknowledgement of receipt of the message back to the intermediary 106. The intermediary 106 may use the acknowledgement to determine whether or not the message should be transmitted or re-transmitted using the second communication channel 110b. For example, if the intermediary 106 receives the acknowledgment from the destination 104, then the intermediary 106 knows that the message was delivered successfully. The intermediary 106 would not need to send the message again on a different communication channel. However, if the intermediary 106 does not receive an acknowledgement from the destination 104, then the intermediary 106 can re-transmit the message on the second communication channel 110b. In some implementations, the intermediary 106 may wait a configurable period of time for the acknowledgement before re-sending the message using the second communication channel 110b.

In the example implementation where the first communication channel 110a is a socket-based communication channel, the second communication channel 110b may be any of the other types of communication channels previously described. In one implementation, the second communication channel 110b may be a SMS communication channel. In this example, the destination 104 may be a computing device capable of receiving SMS messages, including for example a mobile device such as a mobile phone. The intermediary 106 may store information needing to send an SMS message to the destination 104 in the storage module 113.

If the device is a mobile phone, the information may include a mobile phone number that is stored in the storage module 113 and associated with the particular destination 104. The mobile phone number may be collected by the intermediary 106 as part of a registration process with the destination 104, as discussed in more detail below. The information may be stored along with information needed to communicate with the destination 104 using the other communication channels, including the unique channel ID for socket-based communications. The communication information associated with a particular destination 104 may be part of a destination profile that is stored in the storage module 113 in a database, table or other storage means that enables a look up of the information for use in delivery of messages to the destination 104.

As discussed above, if the intermediary 106 first attempts to deliver the message using the socket-based communication channel and no acknowledgement is received from the destination 104 within a period of time, then the intermediary 106 may send the message using the SMS communication channel. In this manner, the source 102 has the benefit of multiple channels of communication to the destination 104 through the intermediary, where the source 102 only needs to transmit the message one time. The intermediary 106 then processes the message for routing including using multiple different communication channels to transmit the message to the destination 104.

In one example, one of the communication channels 110a-110n may be a voice communication channel. For instance, the voice communication channel may be the first communication channel 110a, the second communication channel 110b or one of the other communication channels 110n. A message, such as a text message, may be sent from a source 102 for delivery to a destination 104, such as a mobile subscriber using a mobile phone. The intermediary 106 may receive the text message and convert the text message to an audio message for transmission to the destination 104. The intermediary 106 may select the voice communication channel for delivery of the converted text to audio message using a mobile phone number of the mobile subscriber. That is, the intermediary 106 may initiate a call to the mobile subscriber and transmit the audio of the text message to the mobile subscriber using the voice communication channel. The voice communication channel may be utilized as designated by the source 102 for designated messages and/or as designated by the destination 104 in preferences and/or by capability to receive such messages over the voice communication channel.

The intermediary 106 may send deliver receipts to the source 102 to notify the source 102 of the of which communication channels were attempted and which channels were successful in delivering the message. In this manner, the source 102 is informed of the message status in terms of the communication channels attempted and the ones that were successfully delivered.

The intermediary 106 includes the decision engine 112. The decision engine 112 is operably coupled to the gateway 108 and to the communication channels 110a-110n. The decision engine 112 may include logic and/or algorithms to determine the selection and routing of the message on the various different communication channels. The decision engine 112 may access and use the information stored in the storage module 113 to assist in the routing decisions.

The decision engine 112 may be configured to operate in various manners. In one implementation, the decision engine 112 may be configured to select the first communication channel 110a to route the message for transmission to the destination 104. If an acknowledgement is not received within a period of time, then the decision engine 112 may select the second communication channel 110b to route the message for transmission to the destination 104. In this manner, the lack of an acknowledgement triggers the decision engine 112 to select a different communication channel on which to re-transmit the message to help ensure successful delivery of the message to the destination 104.

In other implementations, the decision engine 112 may be configured to check for an active connection between the first communication channel 110a and the destination 104 prior to selecting and routing the message using the first communication channel 110a. If the connection is determined to be active, then the decision engine 112 selects and routes the message to the first communication channel 110a. The decision engine 112 may follow the process described above with respect to receiving an acknowledgement to determine whether or not the message may need to be re-transmitted on a different communication channel. If the connection is not active, then the decision engine 112 selects and routes the message to the second communication channel 110*b*.

In some implementations, the decision engine 112 may select and route the message to the destination on multiple communication channels 110*a*-110*n* simultaneously, for instance, using both the first communication channel 110*a* and the second communication channel 110*b*. The decision engine 112 may use information from the source 102, the destination 104 or message type information, all as may be stored in the storage module 113, to determine whether to send the message on multiple communication channels 110*a*-110*n* simultaneously.

In other implementations, the decision engine 112 may use other information provided by, collected from or otherwise attainable about the destination 104 in order to select and route the message using one or more of the communication channels 110*a*-110*n*. For instance, the destination 104 may provide communication channel preferences and other preferences (e.g., day-of-week details, time-of-day details, presence information, geographic location preferences, etc.) that the decision engine 112 may take into account when selecting and routing the message. Also, the decision engine 112 may use location-based information for the destination 104 to determine on which communication channel(s) to route the message for transmission to the destination 104.

The intermediary 106 also may include an optional security module 114. The security module 114 may be used to provide security to the messages, such as encryption, authentication, authorization and access (AAA), prior to the message being transmitted to the destination 104. Various different encryption protocols may be implemented and used to secure the transmission of the messages. Each of the communication channels 110*a*-110*n* may have its own unique channel ID, as discussed above, and each unique channel ID may include its own set of unique authorization and cipher keys.

Figure 2:
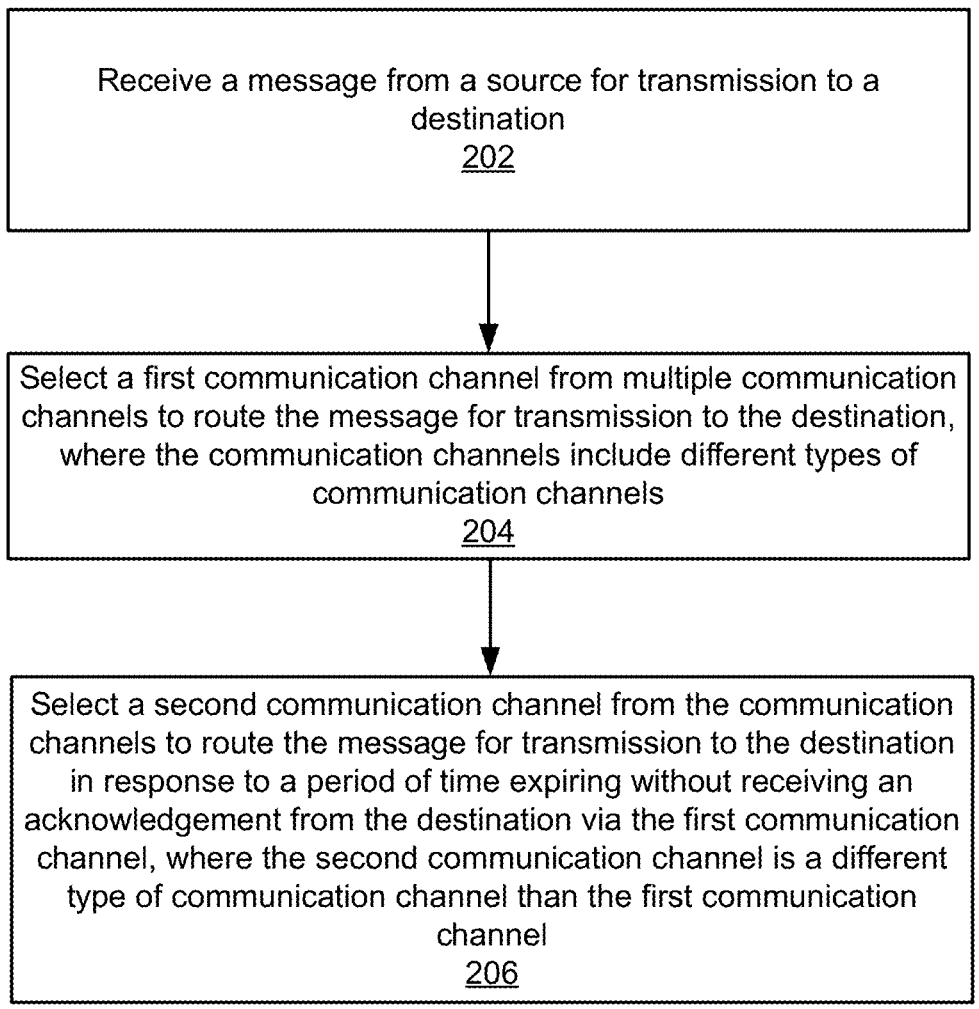
FIG. 2 is a flowchart illustrating example operations of the system of FIG. 1.

Referring to FIG. 2, an example flowchart illustrates a process 200 for example operations of the system of FIG. 1. Process 200 includes receiving a message from a source for transmission to a destination (202). For example, with reference to FIG. 1, a gateway 108 at the intermediary 106 is configured to receive a message from a source 102 for transmission to a destination 104 (202).

Process 200 includes selecting a first communication channel from multiple communication channels to route the message for transmission to the destination, where the communication channels include different types of communication channels (204). For example, with reference to FIG. 1, the decision engine 112 at the intermediary 106 is configured to select a first communication channel 110*a* from multiple communication channels 110*a*-110*n* to route the message for transmission to the destination 104. The multiple communication channels 110*a*-110*n* include different types of communication channel, as discussed above with respect to FIG. 1.

The decision engine 112 may default to select the first communication channel to route the message. The decision engine 112 also may use rules or criteria to determine which communication channel to select to route the message, where the rules and/or other criteria may be stored in the storage module 113. The selection rules are discussed in more detail below with respect to FIG. 3.

Process 200 includes selecting a second communication channel from the communication channels to route the message for transmission to the destination in response to a period of time expiring without receiving an acknowledgement from the destination via the first communication channel, where the second communication channel is a different type of channel than the first communication channel (206). For example, with reference to FIG. 1, the decision engine 112 at the intermediary 106 is configured to select the second communication channel 110*b* to route the message for transmission to the destination 104 in response to a period of time expiring without receiving an acknowledgement from the destination 104 via the first communication channel 110*a*. The second communication channel 110*b* is a different type of communication channel than the first communication channel 110*a*.

In one example implementation, the first communication channel 110*a* is a socket-based communication channel and the second communication channel 110*b* is a SMS communication channel. The decision engine 112 first selects the socket-based communication channel to route the message to the destination 104, which may be a mobile phone device. If the mobile phone device, which may be running a mobile application that is configured to send and receive messages, does not acknowledge receipt of the message sent over the socket-based communication channel, then the decision engine 112 may select the SMS communication channel to send the message to the mobile phone.

The decision engine 112 may wait a configurable period of time for the acknowledgement. If the acknowledgement is received within the configurable period of time, then the decision engine 112 does not need to select the second communication channel 110*b* to route the message. If the acknowledgement is not received within the configurable period of time, then the decision engine 112 selects the second communication channel 110*b* to route the message. Of course, it is understood that the decision engine 112 may use rules or other criteria to select a different communication channel other than the second communication channel on which to route the message when an acknowledgement is not received. Also, the decision engine 112 may select multiple communication channels on which to route the message when an acknowledgement is not received.

The process 200 illustrated in FIG. 2 may be used by various types of sources and destinations. In one example implementation, the source may include a service provider such as a bank, Internet service provider or other provider, that uses a two-factor authentication process to enable access to services of the provider. Process 200 may be used as a portion of the two-factor authentication process to send a one-time artifact from the source through the intermediary to the destination. In this manner, the process 200 helps to ensure timely and successful delivery of the message (i.e., the one-time artifact) from the source to the destination using one or more of the communication channels as may be appropriate.

For example, a bank customer may install a web application on a mobile device. The mobile device for the customer may correspond to the destination 104. The web application may enable the customer to register for push notifications, which enables the customer to receive alerts on both push notification and SMS channels. In this example, the push notifications may include a web socket-based communication channel. The customer using the web application on the mobile device may register for the push notifications, which enables the bank, as the source 102, to send messages through the intermediary 106 using both push notification channels and SMS channels.

In one example, when the customer attempts a transaction which requires a two factor authentication, the bank sends an HTTPS request to the intermediary 106. The decision engine 112 processes the message, which performs a check to see if the customer has registered to receive push notifications. The decision engine 112 may perform a look up in the storage module 113 to check for the push notification registration.

If the customer has registered for push notifications and the mobile device is active, the decision engine 112 will dispatch the message using the push notifications channel to the customer's mobile application on the mobile device. If the customer has not registered for push notifications or is not currently reachable (e.g., the push notification communication channel is not active), then the decision engine 112 will dispatch the message using the SMS communication channel.

Figure 3:
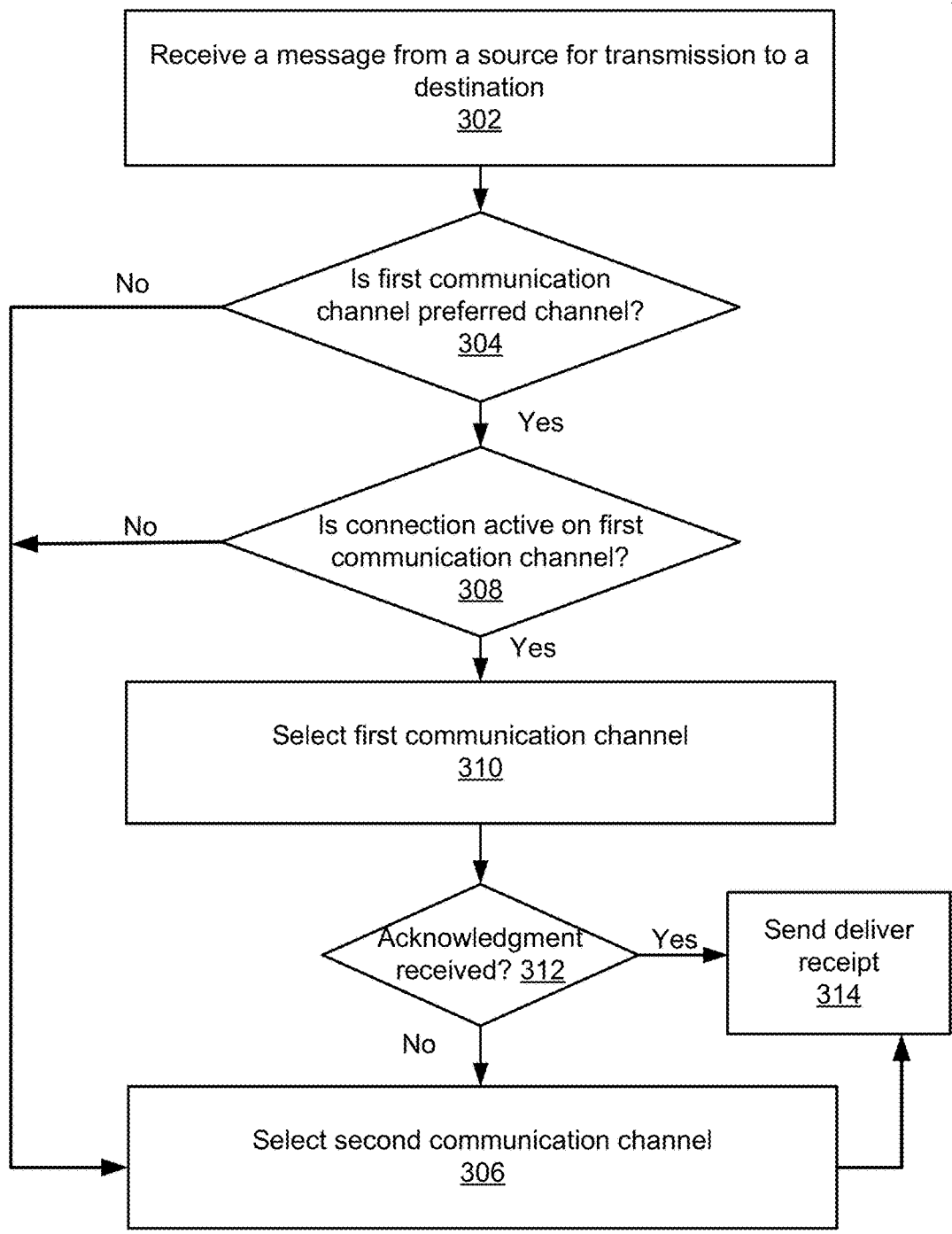
FIG. 3 is a flowchart illustrating example operations of the system of FIG. 1.

Referring to FIG. 3, an example flowchart illustrates a process 300 for example operations of the system of FIG. 1. Process 300 includes receiving a message from a source for transmission to a destination (302). For example, with reference to FIG. 1, a gateway 108 at the intermediary 106 is configured to receive a message from a source 102 for transmission to a destination 104 (302).

Process 300 includes determining whether the first communication channel is a preferred communication channel in response to receiving a message (304). Determining whether or not the first communication channel is a preferred channel may include looking up a preferences or rules table to make the preference determination. For example, the storage module 113 may store a table that includes communication channel preferences that may take into account communication channel preferences of the destination 104 and/or the source 102. The communication channel preferences may include preferences related to time-of-week, time-of-day, geographic location, presence or active connection and other factors. The decision engine 112 may look up the communication preferences in the storage module 113 and determine which of the communication channels may be used. In one implementation, the communication channel preferences may be collected and stored in the storage module 113 during a registration process, as discussed in more detail below.

If the first communication channel is not the preferred communication channel, then a second communication channel is selected to route the message for transmission to the destination (306). For example, with reference to FIG. 1, if the decision engine 112 determines the first communication channel 110a is not the preferred communication channel, then the decision engine 112 selects the second communication channel 110b to route the message for transmission to the destination 104.

If the first communication channel is the preferred communication channel, process 300 includes determining if a connection is active between a first communication channel and the destination prior to selecting the first communication channel (308). For example, with reference to FIG. 1, the decision engine 112 may determine if a connection is active between the first communication channel 110a and the destination 104 prior to selecting the first communication channel to send the message. In one example implementation, the first communication channel 110a may be a socket-based communication channel, which is a persistent and secure channel with the destination 104. The decision engine 112 checks to see that the connection is active and not dormant or disconnected before select and routing the message to the first communication channel 110a. While process 300 illustrates the decision block 304 prior to the decision block 308, it is to be understood that the order of the decision blocks 304 and 308 may be switched and/or performed nearly simultaneously.

Process 300 includes selecting the second communication channel to route the message for transmission to the destination if the connection is not active (306). For example, with reference to FIG. 1, if the decision engine 112 determines the connection is not active between the first communication channel 110a and the destination 104, even if the first communication channel is the preferred communication channel, then the decision engine 112 does not select the first communication channel 110a and instead selects the second communication channel 110b (306). While process 300 describes the making a selection between a first communication channel and a second communication channel, it is to be understood that the selection may include other communication channels as well.

If the first communication channel is the preferred communication channel, or at least the default communications channel, and the first communication channel is active, then the first communication channel is selected to route the message for transmission to the destination (310). For example, with reference to FIG. 1, the decision engine 112 may select the first communication channel 110a to route the message for transmission to the destination 104.

Process 300 includes determining whether or not an acknowledgement was received from the destination (312). The acknowledgment may include a return message from the destination to the intermediary via the first communication channel. The acknowledgement provides an indication to the intermediary that the message was successfully delivered to the destination. If the acknowledgement was received, then a deliver receipt may be sent to the source (314). The deliver receipt may be a message from the intermediary 106 to the source 102 that indicates the communication channels over which the message was attempted and the communication channels over which delivery was successful or unsuccessful.

If no acknowledgement is received, then the second communication channel may be selected to route the message for transmission to the destination. For example, the decision 112 may select the second communication channel 110b to route the message for transmission to the destination (104) if an acknowledgement is not received from the destination within a pre-determined period of time.

Figure 4:
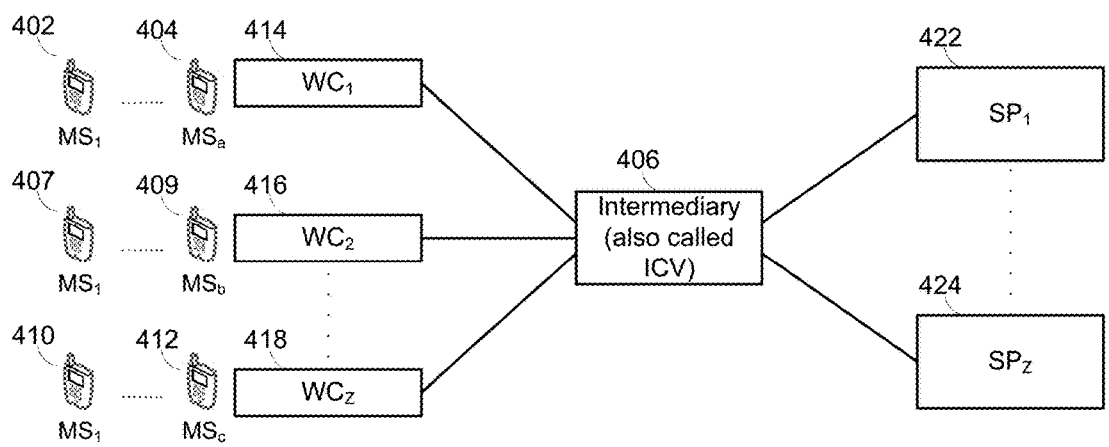
FIG. 4 is a block diagram of a system for message delivery between a source and a destination.

Referring to FIG. 4, an example block diagram illustrates a system 400. The system 400 is an example implementation of the system 100 of FIG. 1. The system 400 also may perform the process 200 and 300 of FIGS. 2 and 3, respectively. The system 400 provides an illustrative framework for an example implementation of the system 100, and more specifically, of the intermediary 106 of FIG. 1.

As a Mobile Subscriber (MS, for example a user of a Wireless Device (WD) such as inter alia a smartphone, a tablet computer, etc.) goes about her daily activities, she may encounter any number of instances where she will engage in an activity (e.g., a financial transaction) where she would like to enhance the security of that activity. For example, the MS:1) She may wish to determine the balance of one of her (bank, brokerage, credit card, etc.) accounts; 2) She may wish to complete the payment portion of a purchase (from, for example, an on-line retailer, etc.); 3) She may wish to transfer money between various of her (bank, brokerage, credit card, etc.) accounts, transfer money from one of her (bank, brokerage, credit card, etc.) accounts to someone else, transfer money to someone else (perhaps another MS) with the amount of the transfer (along with, for example, charges, fees, etc.) appearing on her Wireless Carrier (WC) statement, etc.

The specific examples that were presented above are illustrative only and it will be readily apparent to one of ordinary skill in the relevant art that numerous other examples are easily possible and indeed are fully within the scope of the present disclosure.

The system 400 includes an intermediary 406, which also may be referred to as an Inter-Carrier Vendor (ICV). The ICV 406 may correspond to the intermediary 106 of FIG. 1, and perform the functions as described above with respect to intermediary 106.

The ICV 406 may, for example, be realized through any combination of, possibly inter alia, any one or more of (1) an element of a WC, an element of a landline carrier, or multiple such elements working together; (2) a Third-Party (3P) such as possibly inter alia a merchant, a Content Provider (CP, such as for example a news organization, an advertising agency, a brand, etc.), a Service Provider (SP, such as for example a bank, a financial institution, a provider of mobile services, etc.), etc.; (3) multiple 3P entities working together; (4) a service bureau; (5) a message service provider, and/or (6) other entities.

As illustrated in FIG. 4, the system 400 includes an ICV 406, which may be disposed between, possibly inter alia, multiple WCs (WC$_1$ 414, WC$_2$ 416-WCz 118) on one side and multiple SPs (SP$_1$ 422-SPz 424) on the other side and is, in effect, a horizontally and vertically scalable 'hub' that may among other things 'bridge' all of the connected entities. Additional entities—such as inter alia CPs—may also connect to an ICV 406.

The ICV 406 thus, as one simple example, may offer various routing, formatting, delivery, value-add, etc. capabilities that provide, possibly inter alia:

1) A WC WC$_1$ 414→WCz 118 (and, by extension, all of the Mobile Subscribers (MSs, such as (MS$_1$ 402→MSa 404, MS$_1$ 407→MS$_b$ 409, MS$_1$ 410 →MS$_c$ 412) that are serviced by the WC WC$_1$ 414→WC$_z$ 418) with ubiquitous access to a broad universe of SPs SP$_1$ 422→SP$_z$ 424, and 2) A SP SP$_1$ 422→SP$_z$ 424 with ubiquitous access to a broad universe of WCs WC$_1$ 114→WC$_z$ 418 (and, by extension, to all of the MSs (MS$_1$ 402→MS$_a$ 404, MS$_1$ 407→MS$_b$ 409, MS$_1$ 410→MS$_c$ 412) that are serviced by the WCs WC$_1$ 414 →WC$_z$ 418).

Generally speaking an ICV 406 may have varying degrees of visibility (e.g., access, etc.) to the (MS←→MS, MS←→SP, etc.) data, roaming, messaging, voice, signaling, etc. traffic.

A WC may elect to route just their out-of-network traffic to the ICV 406. Under this approach the ICV 406 would have visibility (e.g., access, etc.) to just the portion of the WC's traffic that was directed to the ICV 406 by the WC.

A WC may elect to route all of their traffic to the ICV 406. The ICV 406 may, possibly among other things, subsequently return to the WC that portion of the traffic that belongs to (i.e., that is destined for an entity of) the WC. Under this approach the ICV 406 would have visibility (e.g., access, etc.) to all of the WC's traffic.

While the discussion below may reference an ICV, it will be readily apparent to one of ordinary skill in the relevant art that numerous other implementation arrangements are equally applicable and indeed are fully within the scope of the present disclosure.

As just one example of an alternative arrangement, aspects of the solution may be offered by a SP. A SP may, for example, be realized through any combination of, possibly inter alia, any one or more of (1) an element of a WC, an element of a landline carrier, an element of a ICV, or multiple such elements working together; (2) a 3P such as possibly inter alia a merchant, a CP (such as for example a news organization, an advertising agency, a brand, etc.), a financial institution, etc.; (3) multiple 3P entities working together; (4) a service bureau; (5) a message service provider; and/or (6) other entities.

Figure 5:
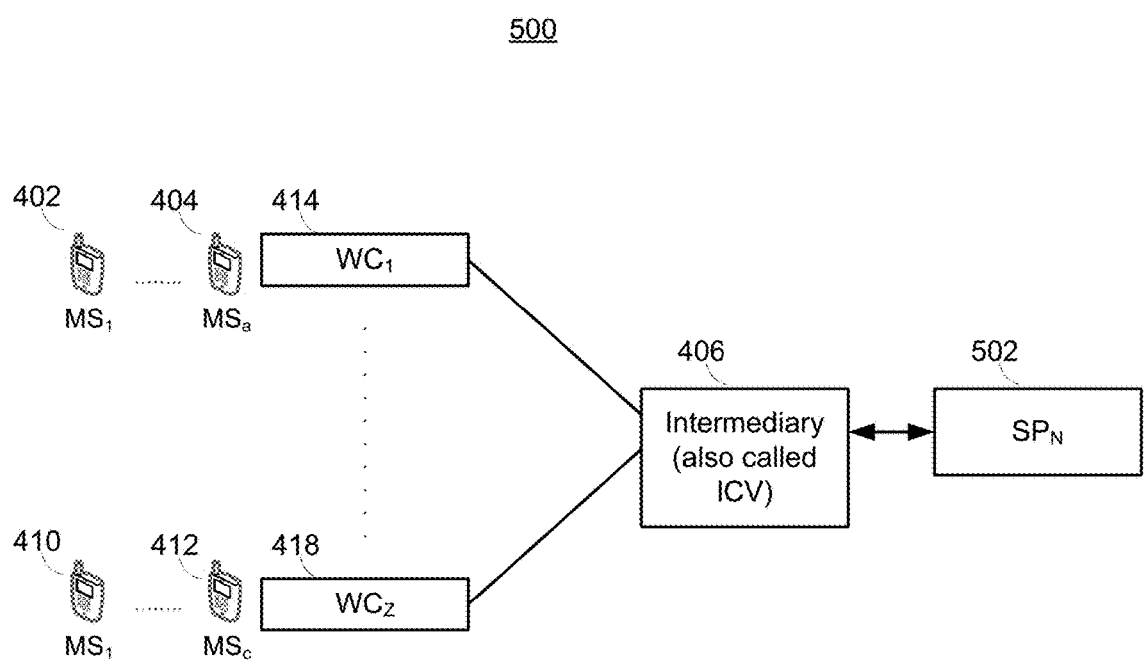
FIG. 5 is a block diagram of a system for message delivery between a source and a destination.

Referring to FIG. 5, an example block diagram illustrates a system 500. The system 500 is an example implementation of the system 100 of FIG. 1 and the system 400 of FIG. 4. The system 500 also may perform the process 200 and 300 of FIGS. 2 and 3, respectively. The system 500 provides an illustrative framework for an example implementation of the system 100, and more specifically, of the intermediary 106 of FIG. 1, where intermediary 406 (or ICV 406) performs the functions of intermediary 106 of FIG. 1.

FIG. 5 and reference numeral 500 (see below) depict one particular arrangement that may be possible under an alternative arrangement. As the diagram portrays, the messaging traffic of numerous MSs (MS$_1$ 402→MS$_a$ 404 and MS$_1$ 110 →MS$_c$ 412) that are serviced by WC$_1$ 414→WC$_z$ 418 is exchanged with the ICV 406 and the ICV 406 is connected with a specific SP, SP$_N$ 502, a SP that offers, possibly inter alia, aspects of the present solution.

While the discussion above referred to one specific alternative arrangement, it will be readily apparent to one of ordinary skill in the relevant art that numerous other alternative arrangements (including inter alia the use of multiple SPs; the sharing, blending, etc. of functionality between an ICV and one or more SPs; etc.) are equally applicable and indeed are fully within the scope of the present solution.

For simplicity of exposition, portions of the discussion below will include a single ICV. As noted above, it will be readily apparent to one of ordinary skill in the relevant art that numerous other arrangements are easily possible (e.g., any combination of one or more of inter alia a single ICV, multiple ICVs, a single SP, multiple SPs, etc.).

Aspects of the present solution may incorporate one or more repositories within which various pieces of information (such as for example definitional data, artifacts of processing, etc.) may be deposited, updated, managed, extracted, reported on, etc.

Aspects of the present solution may incorporate a delivery channel (SMS messaging, EMS messaging, MMS messaging, electronic mail, a socket-based paradigm, IM, etc.) selection process that may leverage any combination of one or more of inter alia rules (regarding for example timeouts, delays, etc.), logic, repositories, workflows and workflow engines, user preference information (that may for example be collected during a user registration process and which may comprise day-of-week details, time-of-day details, location details, security requirements, thresholds, etc.), information on the physical location of the user (via their device), requirements/etc. regarding the quanta of data (such as inter alia importance, expiration time, etc.), quality of service constraints, etc.

Figure 6:
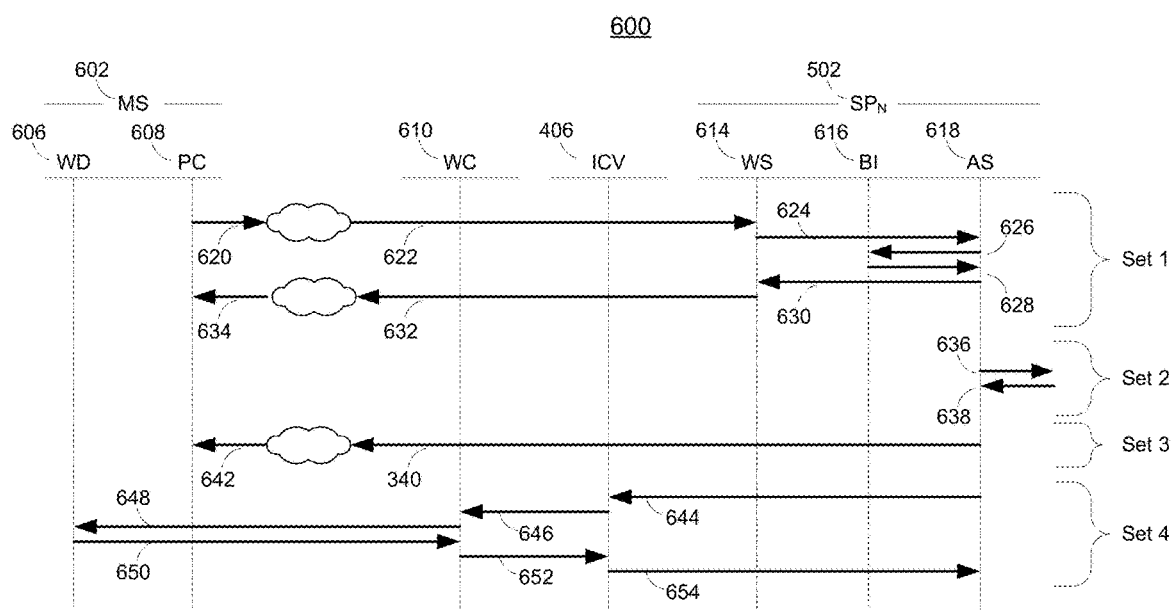
FIG. 6 is a flow diagram of a message delivery registration process.

Referring to FIG. 6, an example flow diagram 600 illustrates various of the exchanges or interactions that might occur under an optional registration portion of the present solution. Such a registration process may be tailored (e.g., the range of information gathered, the scope of services subsequently offered, etc.) to the class of user—e.g., possibly inter alia different types, categories, etc. of users may complete different registration processes. Additionally, a registration process may be supported or offered by any combination of one or more entities (e.g., a 3P such as a financial institution, a retail establishment, an on-line retailer, an employer, a utility company, etc.; a SP; etc.). As well, some or all of the information that is collected during a registration process may be shared or exchanged between any combination of one or more entities (e.g., a SP, a 3P, etc.). Thus, a MS may complete a (required or optional) registration process with any number of entities and aspects of the information that is collected during a given registration process may be shared or exchanged between any number of entities. The illustrative registration process that is depicted through FIG. 6 is supported or offered by a SP (specifically by $SP_N$ 502).

FIG. 6 and flow diagram 600 include the following entities:

MS 602 WD 606. For example, a smartphone, tablet computer, etc. belonging to Mary 602.

MS 602 Personal Computer (PC) 608. For example, a home, work, etc. PC of Mary 602.

WC 610, which is a provider of service for a WD 606 of Mary 602.

ICV 406. An ICV, although not required, provides significant advantages, where intermediary 406 (or ICV 406) performs the functions of intermediary 106 of FIG. 1.

$SP_N$ 602 Web Server (WS) 614. A publicly-available WWW site that is optionally provided by $SP_N$ 502.

$SP_N$ 602 Billing Interface (BI) 616. A single, consolidated interface that $SP_N$ 502 may use to easily reach, possibly inter alia, one or more internal and/or external entities such as a credit card or debit card clearinghouse, a carrier billing system, a service bureau that provides access to multiple carrier billing systems, invoicing or billing facilities, etc.

$SP_N$ 502 Application Server (AS) 618, which are facilities that support aspects of the present solution.

$SP_N$ 502 Gateway (GW) 620, which is a facility through which $SP_N$ 604 may exchange possibly inter alia (SMS, MMS, etc.) messages, application directives, HyperText Transfer Protocol (HTTP) or equivalent data, etc. with possibly inter alia an ICV 406.

It is important to note that while in FIG. 6 the MS 602 WD 606 and MS 602 PC 608 entities are illustrated as being adjacent or otherwise near each other, in actual practice the entities may, for example, be physically located anywhere. Additionally, numerous alternative registration approaches are easily possible involving inter alia different components (e.g., one alternative approach may not include MS 602 PC 608), component arrangements, and/or interactions.

In FIG. 6, the exchanges that are collected under the designation Set 1 represent the activities that might take place as Mary 602 completes a registration process with $SP_N$ 502:

A) Mary 602 uses one of her PCs 608 to visit a WS 614 of $SP_N$ 502 to, possibly among other things, complete a service registration process (see 622→624).

B) AWS 614 of $SP_N$ 502 interacts with an AS 618 of $SP_N$ 502 to, possibly among other things, commit some or all of the information that Mary 602 provided to one or more data repositories (e.g., a databases), optionally initiate a billing transaction, etc. (see 626).

C) As appropriate and as required a BI 616 completes a billing transaction (see 628→630).

D) After receiving a response from an AS 618 of $SP_N$ 502 (632) a WS 614 of $SP_N$ 502 responds appropriately (e.g., with the presentation of a confirmation message, etc.) (see 634→636).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW, wireless messaging (SMS, MMS, etc.), e-mail messages, IM, conventional mail, telephone, an Interactive Voice Response (IVR) facility, etc.

During the registration process described above a range of information may be captured from a MS including, possibly inter alia:

A) Identifying Information. For example, possibly among other things, name, address, age, landline and wireless Telephone Numbers (TNs), e-mail addresses, IM names/identifiers, a unique identifier and a password, etc.

B) Account Information. For example, possibly among other things, various of the particulars for one or more of a MS' accounts (with organizations such as, possibly inter alia, utility companies, financial institutions, on-line retailers, etc.). The particulars may include, possibly inter alia, organization name and contact details, account number, account access credentials, etc.

C) Security Information. For example, possibly among other things, the selection of one or more of the different security plans, programs, etc. that a SP may optionally offer (each of which may carry, possibly inter alia, some type of fee or charge). Such plans, programs, etc. may provide, possibly inter alia, alerts to a MS (via, for example, SMS, MMS, E-Mail, IM, etc.) based on various events, criteria, thresholds, etc.; additional levels of notification, confirmation, etc. during a transaction; etc.

D) Billing Information. For example, the particulars (such as, possibly inter alia, name, account/routing/etc. numbers, etc.) for financial institution (bank, brokerage, etc.) accounts, credit cards, debit cards, etc. As well, possibly the selection of one or more of the different service billing models that may be offered by a SP (including, inter alia, a fixed one-time charge, a recurring [monthly, etc.] fixed charge, a recurring [monthly, etc.] variable charge, a per-transaction charge, etc.) and possibly the selection of one or more of the different payment mechanisms that may be offered by a SP (including, possibly among other things, credit or debit card information, authorization to place a charge on a MS's phone bill, authorization to deduct funds from a MS' [bank, brokerage, etc.] account, etc.).

E) Other Information. Additional, possibly optional, information.

The specific pieces of information that were described above are illustrative only and it will be readily apparent to one of ordinary skill in the relevant art that numerous other pieces of information (e.g., additional Identifying Information, scheduled daily/weekly/etc. reporting desired and/or on-demand reporting desired, etc.) are easily possible and indeed are fully within the scope of the present invention.

As noted above the information that Mary provided during the registration process may be preserved in a repository (e.g., a database) and may optionally be organized as a MS Profile.

The content of Mary's profile may be augmented by $SP_N$ 502 to include, as just a few examples of the many possibilities, internal and/or external demographic, psychographic, sociological, etc. data. In some implementations, the information collected may be solely for the use of routing messages using the appropriate communications channel as selected by the intermediary. In some implementations, only information that is needed to route messages is collected and stored.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, inter alia:

1) The appearance of a line item charge on the bill or statement that a MS receives from her WC.

2) The charging of a credit card or the debiting of a debit card.

3) The (electronic, etc.) transfer of funds.

4) The generation of an invoice, statement, etc.

In FIG. 6, the exchanges that are collected under the designation Set 2 represent the activities that might take place as $SP_N$ 502 optionally coordinates, etc. with one or more external entities to, possibly among other things, secure access, exchange and/or confirm collected information, arrange to receive updates, etc. (see 638→640). During such exchanges $SP_N$ 502 may employ any combination of one or more of possibly inter alia an Application Programming Interface (API), an interface layer, an abstraction layer, communication protocols, etc.

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present description.

In FIG. 6, the exchanges that are collected under the designation Set 3 represent the activities that might take place as an AS 618 of $SP_N$ 502 dispatches to Mary 602 one or more confirmation e-mail messages (see 642→644).

The specific exchanges that were described above (as residing under the designation Set 3) are illustrative only and it will be readily apparent to one of ordinary skill in the relevant art that numerous other exchanges (including, inter alia, the dispatch of multiple e-mail messages [i.e., multiple instances of the sequence 642→644], the reply by Mary 602 to a received e-mail message, etc.) are easily possible and indeed are fully within the scope of the present invention.

In FIG. 6, the exchanges that are collected under the designation Set 4 represent the activities that might take place as an AS 618 of $SP_N$ 502 dispatches one or more confirmation, opt-in, etc. (SMS, MIMS, etc.) messages to a WD 606 of Mary 602 (646→652) and Mary 602 optionally replies or responds to the message(s) (654→660). Of interest and note are:

In the instant example the messages are shown traversing the ICV 406.

$SP_N$ 502 may employ a Short Code (SC) or a regular TN as its source address (and to which it would ask users of its service to direct any reply messages).

The specific exchanges that were described above (as residing under the designation Set 4) are illustrative only and it will be readily apparent to one of ordinary skill in the relevant art that numerous other exchanges are easily possible and indeed are fully within the scope of the present invention. For example, one or more of a confirmation, opt-in, etc. exchange may incorporate other (e.g., non-message) communication paradigms.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, aspects of the registration information that was described above may subsequently be managed (e.g., existing information may be edited or removed, new information may be added, etc.) through any combination of one or more channels including, inter alia, a WWW facility, wireless messaging (SMS, MMS, etc.), e-mail messages, IM exchanges, conventional mail, telephone, IVR facilities, etc. Additionally, aspects of the registration information may be exchanged with one or more entities (such as possibly inter alia a 3P such as a financial institution, a retail establishment, an on-line retailer, an employer, a utility company, etc.; another SP; etc.).

Figure 7:
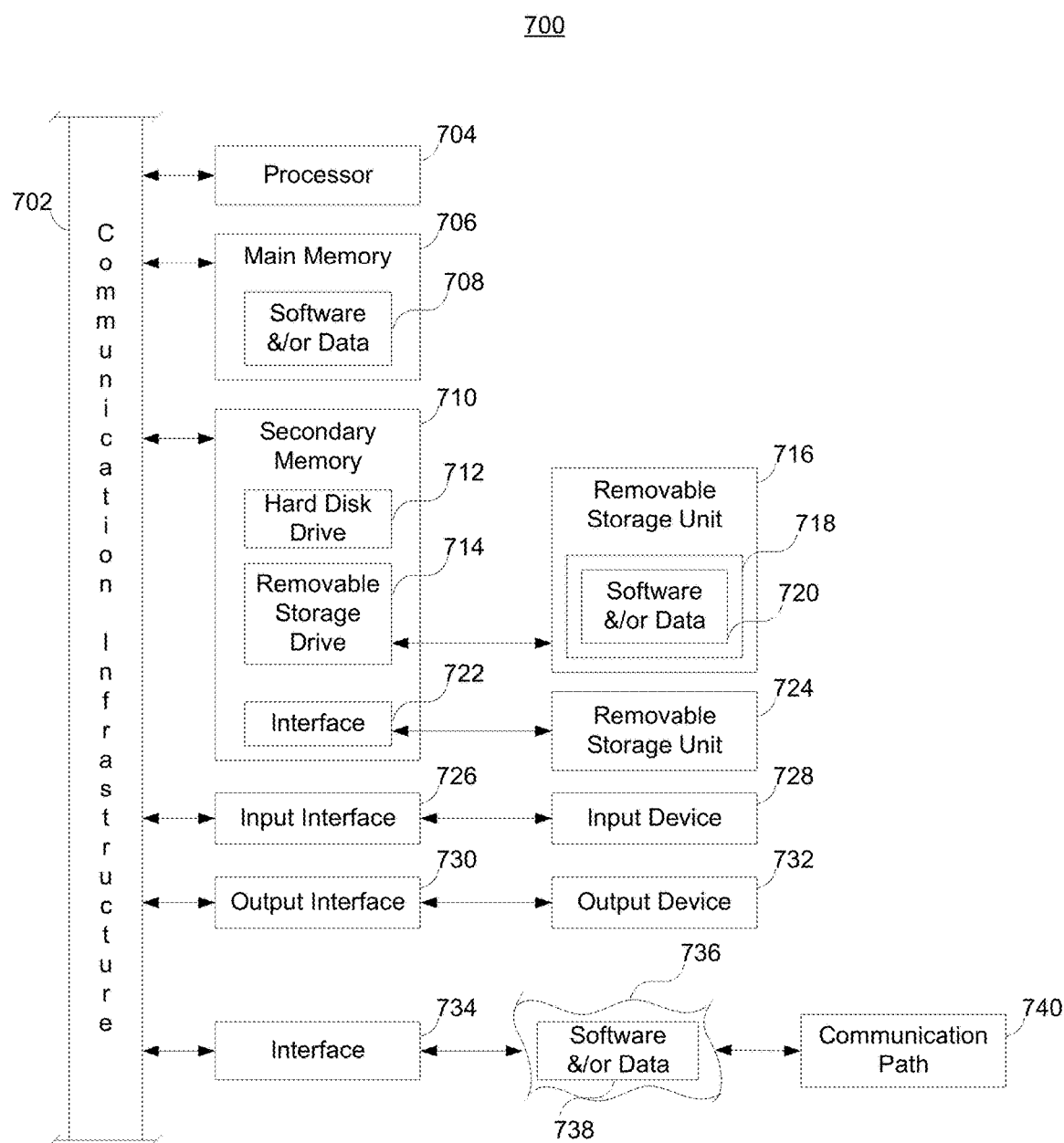
FIG. 7 is an example block diagram of an example computer system.

Aspects of the above can be implemented by software, firmware, hardware, or any combination thereof. Referring to FIG. 7, an example block diagram illustrates an example computer system 700 in which the above, or portions thereof, may be implemented as computer-readable code. Various embodiments of the above are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose processor or a general purpose processor. Processor 704 is connected to a communication infrastructure 702 (for example, a bus or a network).

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may comprise a floppy disk drive, a magnetic tape drive, an optical disk drive, a flash memory, or the like. A removable storage drive 714 reads from and/or writes to a removable storage unit 716 in a well-known manner. A removable storage unit 716 may comprise a floppy disk, magnetic tape, optical disk, etc. which is read by and written to by removable storage drive 714. As will be appreciated by persons skilled in the relevant art(s) removable storage unit 716 includes a computer usable storage medium 718 having stored therein possibly inter alia computer software and/or data 720.

In alternative implementations, secondary memory 710 may include other similar means for allowing computer programs or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 716, removable storage unit 724, and a hard disk installed in hard disk drive 712. Computer program medium and computer usable medium can also refer to memories, such as main memory 706 and secondary memory 710, which can be memory semiconductors (e.g. Dynamic Random Access Memory (DRAM) elements, etc.). These computer program products are means for providing software to computer system 700.

Computer programs (also called computer control logic) are stored in main memory 706 and/or secondary memory 710. Computer programs may also be received via communications interface 734. Such computer programs, when executed, enable computer system 700 to implement the present invention as discussed herein. In particular, the computer programs, when executed, enable processor 704 to implement the processes of aspects of the above. Accordingly, such computer programs represent controllers of the computer system 700. Where the invention is implemented using software, the software may be stored in a computer program product and loaded into computer system 700 using removable storage drive 714, interface 722, hard drive 712 or communications interface 734.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented system for message processing, the system comprising:
    an intermediary that is interposed between a source and a destination, wherein the source comprises a first computing device and the destination comprises a second computing device, wherein the intermediary comprises:
        a gateway that is configured to receive a message from the source, wherein the message comprises a source address, a destination address, and a body and the message comprises one of a short message service (SMS) message, a multimedia messaging service (MMS) message, an instant message (IM) message, or an E-Mail message;
        a plurality of communication channels; and
        a decision engine, that is operably coupled to the gateway and the plurality of communication channels, wherein the decision engine is configured to:
            perform a lookup operation against at least one repository using at least the destination address and one or more pre-defined rules, wherein the one or more pre-defined include rules relating to one or more of communication channel preferences and a communication channel active status,
            identify a first communication channel and a second communication channel from the plurality of communication channels using at least an outcome of the lookup operation including the one or more pre-defined rules,
            route aspects of the message towards the destination using the first communication channel using at least the outcome of the lookup operation including the one or more pre-defined rules, and
            selectively route aspects of the message towards the destination using the second communication channel using at least the outcome of the lookup operation including the one or more pre-defined rules.

2. The computer-implemented system of claim 1, wherein the source address and the destination address each are either a telephone number or a short code.

3. The computer-implemented system of claim 1, wherein the decision engine comprises a security module.

4. The computer-implemented system of claim 1, wherein the first communication channel comprises a socket-based communication channel.

5. The computer-implemented system of claim 1, wherein first communication channel comprises a secure connection between the first communication channel and the destination using a unique channel.

6. The computer-implemented system of claim 1, wherein the destination comprises a mobile device.

7. A computer-implemented method for executing instructions stored on a non-transitory computer-readable storage medium, the method comprising:
    receiving, at an intermediary disposed between a source and a destination, a message from the source for transmission to the destination, the message comprising a source address, a destination address, and a body, wherein the source comprises a first computing device and the destination comprises a second computing device and the message comprises one of a short message service (SMS) message, a multimedia messaging service (MMS) message, an instant message (IM) message, or an E-Mail message;

performing a lookup operation against at least one repository using at least the destination address and one or more pre-defined rules, wherein the one or more pre-defined include rules relating to one or more of communication channel preferences and a communication channel active status;

identifying a first communication channel and a second communication channel from a plurality of communication channels using at least an outcome of the lookup operation including the one or more pre-defined rules;

routing aspects of the message towards the destination using the first communication channel using at least the outcome of the lookup operation including the one or more pre-defined rules; and selectively routing aspects of the message towards the destination using the second communication channel using at least the outcome of the lookup operation including the one or more pre-defined rules.

8. The computer-implemented method of claim 7, wherein the source address and the destination address each are either a telephone number or a short code.

9. The computer-implemented method of claim 7, wherein the first communication channel comprises a socket-based communication channel.

10. The computer-implemented method of claim 7, wherein first communication channel comprises a secure connection between the first communication channel and the destination using a unique channel.

11. The computer-implemented method of claim 7, wherein the destination comprises a mobile device.

12. A computer program product for message processing, the computer program product being tangibly embodied on a non-transitory computer-readable storage medium and comprising instructions that, when executed by at least one computing device, are configured to cause the at least one computing device to:

receive, at an intermediary disposed between a source and a destination, a message from the source for transmission to the destination, the message comprising a source address, a destination address, and a body, wherein the source comprises a first computing device and the destination comprises a second computing device and the message comprises one of a short message service (SMS) message, a multimedia messaging service (MMS) message, an instant message (IM) message, or an E-Mail message;

perform a lookup operation against at least one repository using at least the destination address and one or more pre-defined rules, wherein the one or more pre-defined include rules relating to one or more of communication channel preferences and a communication channel active status;

identify a first communication channel and a second communication channel from a plurality of communication channels using at least an outcome of the lookup operation including the one or more pre-defined rules;

route aspects of the message towards the destination using the first communication channel using at least the outcome of the lookup operation including the one or more pre-defined rules; and selectively route aspects of the message towards the destination using the second communication channel using at least the outcome of the lookup operation including the one or more pre-defined rules.

13. The computer program product of claim 12, wherein the source address and the destination address each are either a telephone number or a short code.

14. The computer program product of claim 12, wherein the first communication channel comprises a socket-based communication channel.

15. The computer program product of claim 12, wherein first communication channel comprises a secure connection between the first communication channel and the destination using a unique channel.

16. The computer program product of claim 12, wherein the destination comprises a mobile device.

17. The computer program product of claim 12, wherein the second communication channel comprises a short message service (SMS) communication channel.

* * * * *